United States Patent
Thomas et al.

(10) Patent No.: US 9,077,466 B2
(45) Date of Patent: *Jul. 7, 2015

(54) METHODS AND APPARATUS FOR TRANSMISSION OF GROUPS OF CELLS VIA A SWITCH FABRIC

(71) Applicant: Juniper Networks, Inc., Sunnyvale, CA (US)

(72) Inventors: Sarin Thomas, Sunnyvale, CA (US); Srihari Vegesna, San Jose, CA (US); Pradeep Sindhu, Los Altos Hills, CA (US); Chi-Chung Kenny Chen, Palo Alto, CA (US); Jean-Marc Frailong, Los Altos, CA (US); David J. Ofelt, Los Gatos, CA (US); Philip A. Thomas, San Jose, CA (US); Chang-Hong Wu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,425

(22) Filed: Dec. 3, 2012

(65) Prior Publication Data

US 2013/0121343 A1    May 16, 2013

Related U.S. Application Data

(63) Continuation of application No. 12/343,728, filed on Dec. 24, 2008, now Pat. No. 8,325,749.

(51) Int. Cl.
*H04L 12/28* (2006.01)
*H04J 3/00* (2006.01)
(Continued)

(52) U.S. Cl.
CPC .............. *H04J 3/00* (2013.01); *H04L 49/251* (2013.01); *H04L 49/254* (2013.01)

(58) Field of Classification Search
CPC .............. H04J 3/00; H04J 1/16; H04L 12/28; H04L 12/26; H04L 12/56
See application file for complete search history.

(56) References Cited

U.S. PATENT DOCUMENTS

| | | |
|---|---|---|
| 5,457,687 A | 10/1995 | Newman |
| 5,926,473 A | 7/1999 | Gridley |

(Continued)

FOREIGN PATENT DOCUMENTS

| | | |
|---|---|---|
| EP | 1 892 905 A1 | 2/2008 |
| GB | 2 361 139 A | 10/2001 |
| WO | WO 97/04546 | 2/1997 |

OTHER PUBLICATIONS

Search Report for European Application No. 09170041.9, mailed Nov. 23, 2009 (8 pages).

(Continued)

*Primary Examiner* — Anez Ebrahim
(74) *Attorney, Agent, or Firm* — Cooley LLP

(57) ABSTRACT

In one embodiment, a method can include receiving at an egress schedule module a request to schedule transmission of a group of cells from an ingress queue through a switch fabric of a multi-stage switch. The ingress queue can be associated with an ingress stage of the multi-stage switch. The egress schedule module can be associated with an egress stage of the multi-stage switch. The method can also include determining, in response to the request, that an egress port at the egress stage of the multi-stage switch is available to transmit the group of cells from the multi-stage switch.

19 Claims, 6 Drawing Sheets

(51) Int. Cl.
*H04L 12/947* (2013.01)
*H04L 12/937* (2013.01)

(56) References Cited

U.S. PATENT DOCUMENTS

| | | | |
|---|---|---|---|
| 5,978,359 A * | 11/1999 | Caldara et al. | 370/236 |
| 5,987,008 A | 11/1999 | Simpson et al. | |
| 5,987,028 A | 11/1999 | Yang et al. | |
| 5,991,295 A | 11/1999 | Tout et al. | |
| 6,049,546 A | 4/2000 | Ramakrishnan | |
| 6,073,089 A | 6/2000 | Baker et al. | |
| 6,324,165 B1 | 11/2001 | Fan et al. | |
| 6,370,145 B1 | 4/2002 | Dally et al. | |
| 6,438,107 B1 | 8/2002 | Somiya et al. | |
| 6,512,747 B1 | 1/2003 | Umeuchi et al. | |
| 6,618,357 B1 | 9/2003 | Geyer et al. | |
| 6,621,824 B1 * | 9/2003 | Lauffenburger et al. | 370/412 |
| 6,657,962 B1 | 12/2003 | Barri et al. | |
| 6,856,622 B1 * | 2/2005 | Calamvokis et al. | 370/390 |
| 6,944,173 B1 | 9/2005 | Jones et al. | |
| 6,973,032 B1 | 12/2005 | Casley et al. | |
| 6,986,161 B2 | 1/2006 | Billhartz | |
| 7,027,457 B1 | 4/2006 | Chiussi et al. | |
| 7,046,631 B1 | 5/2006 | Giroux et al. | |
| 7,061,862 B2 | 6/2006 | Horiguchi et al. | |
| 7,075,934 B2 | 7/2006 | Chiussi et al. | |
| 7,173,931 B2 | 2/2007 | Chao et al. | |
| 7,185,368 B2 | 2/2007 | Copeland, III | |
| 7,230,947 B1 | 6/2007 | Huber et al. | |
| 7,233,568 B2 | 6/2007 | Goodman et al. | |
| 7,234,168 B2 | 6/2007 | Gupta et al. | |
| 7,269,666 B1 | 9/2007 | Leitner et al. | |
| 7,277,429 B2 | 10/2007 | Norman et al. | |
| 7,327,680 B1 | 2/2008 | Kloth | |
| 7,391,736 B2 | 6/2008 | Na et al. | |
| 7,403,524 B2 | 7/2008 | Hill | |
| 7,424,744 B1 | 9/2008 | Wu et al. | |
| 7,430,175 B2 | 9/2008 | Dropps et al. | |
| 7,457,245 B2 | 11/2008 | McAlpine et al. | |
| 7,519,860 B2 | 4/2009 | Hatonen et al. | |
| 7,540,025 B2 | 5/2009 | Tzadikario | |
| 7,543,052 B1 | 6/2009 | Cesa Klein | |
| 7,719,982 B2 | 5/2010 | Varma | |
| 8,325,749 B2 | 12/2012 | Thomas et al. | |
| 8,553,710 B1 | 10/2013 | White et al. | |
| 2002/0064170 A1 | 5/2002 | Siu et al. | |
| 2002/0075883 A1 | 6/2002 | Dell et al. | |
| 2002/0080789 A1 * | 6/2002 | Henderson et al. | 370/392 |
| 2002/0118692 A1 | 8/2002 | Oberman et al. | |
| 2002/0154637 A1 | 10/2002 | Keller-Tuberg | |
| 2002/0167950 A1 | 11/2002 | Chang et al. | |
| 2003/0005145 A1 | 1/2003 | Bullard | |
| 2003/0026287 A1 | 2/2003 | Mullendore et al. | |
| 2003/0035432 A1 * | 2/2003 | Sreejith et al. | 370/415 |
| 2003/0058880 A1 | 3/2003 | Sarkinen | |
| 2003/0063348 A1 | 4/2003 | Posey, Jr. | |
| 2003/0185154 A1 * | 10/2003 | Mullendore et al. | 370/230 |
| 2003/0218977 A1 | 11/2003 | Pan et al. | |
| 2004/0013124 A1 | 1/2004 | Peebles et al. | |
| 2004/0120276 A1 * | 6/2004 | Golla et al. | 370/321 |
| 2004/0165598 A1 | 8/2004 | Shrimali et al. | |
| 2005/0036502 A1 * | 2/2005 | Blanc et al. | 370/412 |
| 2005/0111460 A1 | 5/2005 | Sahita | |
| 2005/0138238 A1 | 6/2005 | Tierney et al. | |
| 2005/0138243 A1 | 6/2005 | Tierney et al. | |
| 2005/0210533 A1 | 9/2005 | Copeland et al. | |
| 2005/0226156 A1 | 10/2005 | Keating et al. | |
| 2006/0104298 A1 | 5/2006 | McAlpine et al. | |
| 2006/0120289 A1 | 6/2006 | Cunningham | |
| 2006/0123480 A1 | 6/2006 | Oh et al. | |
| 2006/0272018 A1 | 11/2006 | Fouant | |
| 2006/0285548 A1 | 12/2006 | Hill et al. | |
| 2007/0064617 A1 | 3/2007 | Reves | |
| 2007/0067438 A1 | 3/2007 | Goranson et al. | |
| 2007/0086464 A1 * | 4/2007 | Somashekar | 370/392 |
| 2007/0094729 A1 | 4/2007 | Hoefelmeyer et al. | |
| 2007/0118909 A1 | 5/2007 | Hertzog et al. | |
| 2007/0150949 A1 | 6/2007 | Futamura et al. | |
| 2007/0180526 A1 | 8/2007 | Copeland, III | |
| 2007/0192861 A1 | 8/2007 | Varghese et al. | |
| 2007/0240207 A1 | 10/2007 | Belakhdar et al. | |
| 2007/0268830 A1 | 11/2007 | Li et al. | |
| 2008/0080548 A1 | 4/2008 | Mullendore et al. | |
| 2008/0082977 A1 | 4/2008 | Araujo et al. | |
| 2008/0151863 A1 | 6/2008 | Lawrence et al. | |
| 2008/0253289 A1 | 10/2008 | Naven et al. | |
| 2008/0259798 A1 | 10/2008 | Loh et al. | |
| 2008/0263661 A1 | 10/2008 | Bouzida | |
| 2008/0285449 A1 | 11/2008 | Larsson et al. | |
| 2009/0003212 A1 | 1/2009 | Kwan et al. | |
| 2009/0077663 A1 | 3/2009 | Sun et al. | |
| 2009/0300209 A1 | 12/2009 | Elzur | |
| 2010/0061238 A1 | 3/2010 | Godbole et al. | |
| 2010/0061239 A1 | 3/2010 | Godbole et al. | |
| 2010/0061390 A1 | 3/2010 | Godbole et al. | |
| 2010/0158031 A1 | 6/2010 | Thomas et al. | |
| 2010/0165843 A1 | 7/2010 | Thomas | |
| 2011/0154132 A1 | 6/2011 | Aybay | |
| 2011/0267942 A1 | 11/2011 | Aybay et al. | |
| 2011/0310739 A1 | 12/2011 | Aybay | |
| 2012/0140626 A1 | 6/2012 | Anand et al. | |

OTHER PUBLICATIONS

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

Office Action mailed Mar. 26, 2010 for U.S. Appl. No. 12/242,224 (17 pages).

Office Action mailed Mar. 29, 2010 for U.S. Appl. No. 12/242,230 (11 pages).

Office Action mailed May 11, 2010 for U.S. Appl. No. 12/345,490 (12 pages).

William J. Daily, "Virtual-Channel Flow Control" IEEE Transactions on Parallel and Distributed Systems, vol. 3, No. 2, Mar. 1992, pp. 194-205.

Office Action mailed Apr. 29, 2010 for U.S. Appl. No. 12/343,728, filed Dec. 24, 2008.

Office Action mailed Oct. 15, 2010 for U.S. Appl. No. 12/343,728, filed Dec. 24, 2008.

Office Action mailed May 2, 2011 for U.S. Appl. No. 12/343,728, filed Dec. 24, 2008.

Office Action mailed Oct. 7, 2011 for U.S. Appl. No. 12/343,728, filed Dec. 24, 2008.

Office Action mailed Sep. 17, 2010 for U.S. Appl. No. 12/242,224 (9 pages).

Office Action mailed Sep. 17, 2010 for U.S. Appl. No. 12/242,230 (16 pages).

Office Action mailed Oct. 15, 2010 for U.S. Appl. No. 12/345,490 (14 pages).

Office Action mailed Aug. 9, 2011 for U.S. Appl. No. 12/242,224 (7 pages).

Office Action mailed Mar. 17, 2011 for U.S. Appl. No. 12/242,230 (11 pages).

Office Action mailed May 23, 2011 for U.S. Appl. No. 12/558,118 (6 pgs).

Office Action mailed Apr. 1, 2011 for U.S. Appl. No. 12/345,490 (14 pages).

Office Action mailed Aug. 19, 2011 for U.S. Appl. No. 12/345,490 (14 pages).

U.S. Appl. No. 12/953,149, filed Nov. 23, 2010, entitled "Methods and Apparatus for Destination Based Hybrid Load Balancing Within a Switch Fabric" (49 pgs).

U.S. Office Action mailed Oct. 6, 2011 for U.S. Appl. No. 12/242,230.

* cited by examiner

METHODS AND APPARATUS FOR TRANSMISSION OF GROUPS OF CELLS VIA A SWITCH FABRIC

CROSS REFERENCE TO RELATED APPLICATION

This application claims priority to and is a continuation of U.S. patent application Ser. No. 12/343,728, filed Dec. 24, 2008, and entitled "Methods and Apparatus for Transmission of Groups of Cells via a Switch Fabric," which is incorporated herein by reference in its entirety.

BACKGROUND

Embodiments described herein relate generally to a cell-based switch fabric, and, in particular, to transmission of groups of cells via a switch fabric.

Transmission of cells via a switch fabric (e.g., a multi-stage switch fabric) can be, for example, disrupted because of congestion at one or more queues (e.g., an ingress queue, an egress queue) configured to receive the data. In some instances, the disruptions can decrease data transfer rates within the switch fabric and/or can result in the loss of one or more cells due to buffer overflow. These problems can be exacerbated when cells are transmitted via the switch fabric on a cell-by-cell basis based on known switch fabric scheduling strategies and/or when the switch fabric is scaled.

Thus, a need exists for methods and apparatus for transmission of groups of cells via a switch fabric.

SUMMARY OF THE INVENTION

In one embodiment, a method can include receiving at an egress schedule module a request to schedule transmission of a group of cells from an ingress queue through a switch fabric of a multi-stage switch. The ingress queue can be associated with an ingress stage of the multi-stage switch. The egress schedule module can be associated with an egress stage of the multi-stage switch. The method can also include determining, in response to the request, that an egress port at the egress stage of the multi-stage switch is available to transmit the group of cells from the multi-stage switch.

DETAILED DESCRIPTION

Flow of cells (e.g., cells that include one or more portions of one or more data packets such as internet protocol (IP) packets) via a switch fabric can be controlled based on signals transmitted between an ingress schedule module and an egress schedule module. Specifically, the ingress schedule module and the egress schedule module can be configured to coordinate the transmission of groups of cells to one or more egress ports via the switch fabric. For example, the ingress schedule module can be configured to define a group of cells queued at an ingress queue. The ingress schedule module can be configured to send to the egress schedule module a request to schedule transmission of the group of cells to an egress port via the switch fabric. The request can be referred to as a transmission request. If the egress schedule module determines that the egress port is available to receive the group of cells, the egress schedule module can be configured to schedule the transmission of the group of cells via the switch fabric, and the ingress schedule module can be configured to trigger transmission of the group of cells to the egress port via the switch fabric. If the egress schedule module determines that the destination port is unavailable to receive the group of cells, the egress schedule module can be configured to deny the transmission request.

Because the egress schedule module can be configured to authorize (or deny) transmission requests from the ingress schedule module on a group-by-group basis, groups of cells can be transmitted out of the switch fabric (after traversing the switch fabric) with relatively little or no buffering at the egress ports. In some embodiments, the ingress schedule module can be on an ingress side of the switch fabric, included in an ingress line card, and/or can be associated with an ingress stage of the switch fabric. In some embodiments, the egress schedule module can be on an egress side of the switch fabric, included in an egress line card, and/or can be associated with an egress stage of the switch fabric. In some embodiments, the switch fabric can be included in a multi-stage switch or can define at least a core portion of a data center. In some embodiments, the data included within a cell can be referred to as content of the cell.

Figure 1A:
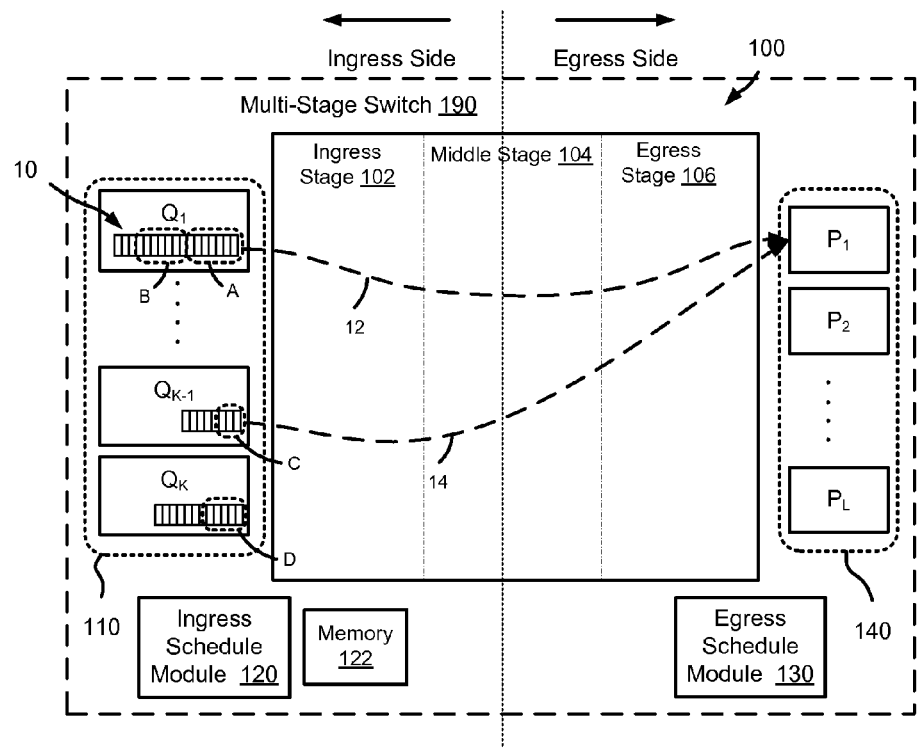
FIG. 1A is a schematic block diagram of an ingress schedule module and an egress schedule module configured to coordinate transmissions of groups of cells via a switch fabric of a multi-stage switch, according to an embodiment.

FIG. 1A is a schematic block diagram of an ingress schedule module 120 and an egress schedule module 130 configured to coordinate transmissions of groups of cells via a switch fabric 100 of a multi-stage switch 190, according to an embodiment. Coordinating can include, for example, scheduling the transmission of the groups of cells via the switch fabric 100, tracking requests and/or responses related to transmission of the groups of cells, and so forth. The ingress schedule module 120 can be included on an ingress side of the switch fabric 100 and the egress schedule module 130 can be included on an egress side of the switch fabric 100. The switch fabric 100 can include an ingress stage 102, a middle stage 104, and an egress stage 106. In some embodiments, the switch fabric 100 can be defined based on a Clos network architecture (e.g., a non-blocking Clos network, a strict sense non-blocking Clos network, a Benes network) and the switch fabric 100 can include a data plane and a control plane. In some embodiments, the switch fabric 100 can be a core portion of a data center (not shown), which can include a network or interconnection of devices.

As shown in FIG. 1A, ingress queues $Q_1$ through $Q_K$ (collectively referred to as ingress queues 110) can be disposed on the ingress side of the switch fabric 100. The ingress queues 110 can be associated with an ingress stage 102 of the switch fabric 100. In some embodiments, the ingress queues 110 can be included in a line card. In some embodiments, the ingress queues 110 can be disposed outside of the switch fabric 100 and/or outside of the multi-stage switch 190. Each of the ingress queues 110 can be a first-in-first-out (FIFO) type queue. As shown in FIG. 1A, egress ports $P_1$ through $P_L$ (collectively referred to as egress ports 140) can be disposed on the egress side of the switch fabric 100. The egress ports 140 can be associated with an egress stage 106 of the switch fabric 100. In some embodiments, the egress ports 140 can be referred to as destination ports.

In some embodiments, the ingress queues 110 can be included in one or more ingress line cards (not shown) disposed outside of the ingress stage 102 of the switch fabric 100. In some embodiments, the egress ports 140 can be included in one or more egress line cards (not shown) disposed outside of the egress stage 106 of the switch fabric 100. In some embodiments, one or more of the ingress queues 110 and/or one or more of the egress ports 140 can be included in a one or more stages (e.g., ingress stage 102) of the switch fabric 100. In some embodiments, the egress schedule module 120 can be included in one or more egress line cards and/or the ingress schedule module 130 can be included in one or more ingress line cards. In some embodiments, each line card (e.g., egress line card, ingress line card) associated with the multi-stage switch 190 can include one or more schedule modules (e.g., egress schedule module, ingress schedule module).

In some embodiments, the ingress queues 110 and/or the egress ports 140 can be included in one or more gateway devices (not shown) disposed between the switch fabric 100 and/or other devices (not shown). The gateway device(s), the switch fabric 100 and/or the other devices can collectively define at least a portion of a data center (not shown). In some embodiments, the switch fabric 100 and the other devices can be configured to handle data based on different protocols. For example, the other devices can include, for example, one or more host devices (e.g., host devices configured to execute one or more virtual resources, a web server) that can be configured to communicate based on an Ethernet protocol and the switch fabric 100, which can be a cell-based fabric. In other words, the gateway device(s) can provide the other devices configured to communicate via one protocol with access to the switch fabric 100, which can be configured to communicate via another protocol. In some embodiments, the gateway device(s) can be referred to as an access switch or as a network device. In some embodiments, the gateway device(s) can be configured to function as a router, a network hub device, and/or a network bridge device.

In this embodiment, for example, the ingress schedule module 130 can be configured to define a group of cells A queued at ingress queue $Q_1$ and a group of cells C queued at ingress queue $Q_{K-1}$. The group of cells A is queued at a front portion of the ingress queue $Q_1$ and a group of cells B is queued within the ingress queue $Q_1$ behind the group of cells A. Because ingress queue $Q_1$ is a FIFO type queue, the group of cells B cannot be transmitted via the switch fabric 100 until the group of cells A have been transmitted from the ingress queue $Q_1$. The group of cells C is queued at a front portion of the ingress queue $Q_{K-1}$.

In some embodiments, a portion of the ingress queues 110 can be mapped to (e.g., assigned to) one or more of the egress ports 140. For example, ingress ports $Q_1$ through $Q_{K-1}$ can be mapped to egress port $P_1$ so that all of the queued cells 310 ingress ports $Q_1$ through $Q_{K-1}$ will be scheduled by the ingress schedule module 120 for transmission via the switch fabric 100 to egress port $P_1$. Similarly, ingress port $Q_K$ can be mapped to egress port $P_2$. The mapping can be stored at a memory (e.g., memory 122) as, for example, a look-up table that can be accessed by ingress schedule module 120 when scheduling (e.g., requesting) transmission of groups of cells.

In some embodiments, one or more of the ingress queues 110 can be associated with a priority value (also can be referred to a transmission priority value). The ingress schedule module 120 can be configured to schedule transmission of cells from the ingress queues 110 based on the priority values. For example, ingress schedule module 120 can be configured to request transmission of group of cells C to egress port $P_1$ before requesting transmission of group of cells A to egress port $P_1$ because ingress queue $Q_{K-1}$ can be associated with a higher priority value than ingress port $Q_1$. The priority values can be defined based on a level of service (e.g., a quality of service (QoS)). For example, in some embodiments, different types of network traffic can be associated with a different level of service (and, thus a different priority). For example, storage traffic (e.g., read and write traffic), inter-processor communication, media signaling, session layer signaling, and so forth each can be associated with at least one level of service. In some embodiments, the priority values can be based on, for example, the Institute of Electrical and Electronics Engineers (IEEE) 802.1qbb protocol, which defines a priority-based flow control strategy.

In some embodiments, one or more of the ingress queues 110 and/or one or more of the egress ports 140 can be paused. In some embodiments, one or more of the ingress queues 110 and/or one or more of the egress ports 140 can be paused so that cells are not dropped. For example, if egress port $P_1$ is temporarily unavailable, transmission of cells from ingress $Q_1$ and/or ingress queue $Q_{K-1}$ can be paused so that cells won't be dropped at egress port $P_1$ because egress port $P_1$ is temporarily unavailable. In some embodiments, one or more of the ingress queues 110 can be associated with a priority value. For example, if egress port $P_1$ is congested, transmission of cells from ingress $Q_1$ to egress port $P_1$ can be paused rather than transmission of cells ingress queue $Q_{K-1}$ to egress port $P_1$ because ingress port $Q_{K-1}$ can be associated with a higher priority value than ingress port $Q_1$.

The ingress schedule module 120 can be configured to exchange signals with (e.g., transmit signals to and receive signals from) the egress schedule module 130 to coordinate the transmission of the group of cells A via the switch fabric 100 to egress port $P_1$, and to coordinate the transmission of group of cells C via the switch fabric 100 to egress port $P_1$. Because the group of cells A is to be transmitted to egress port $P_1$, the egress port $P_1$ can be referred to as a destination port of the group of cells A. Similarly, egress port $P_1$ can be referred to as a destination port of the group of cells B. As shown in FIG. 1A, the group of cells A can be transmitted via a transmission path 12 that is different than a transmission path 14 through which the group of cells C is transmitted.

The group of cells A and the group of cells B are defined by the ingress schedule module 120 based on cells 10 that are queued at ingress queue $Q_1$. Specifically, the group of cells A can be defined based on each cell from the group of cells A having a common destination port and having a specified position within the ingress queue $Q_1$. Similarly, the group of cells C can be defined based on each cell from the group of cells C having a common destination port and having a specified position within the ingress queue $Q_{K-1}$. Although not shown, in some embodiments, for example, the cells 10 can include content (e.g., data packets) received at the multi-stage switch 190 from one or more network entities (e.g., a personal computer, a server, a router, a personal digital assistant (PDA)) via one or more networks (e.g., a local area network (LAN), a wide area network (WAN), a virtual network) that can be wired and/or wireless. More details related to defining of groups of cells, such as group of cells A, the group of cells B, and/or the group of cells C, are discussed in connection with FIGS. 2 and 3.

Figure 1B:
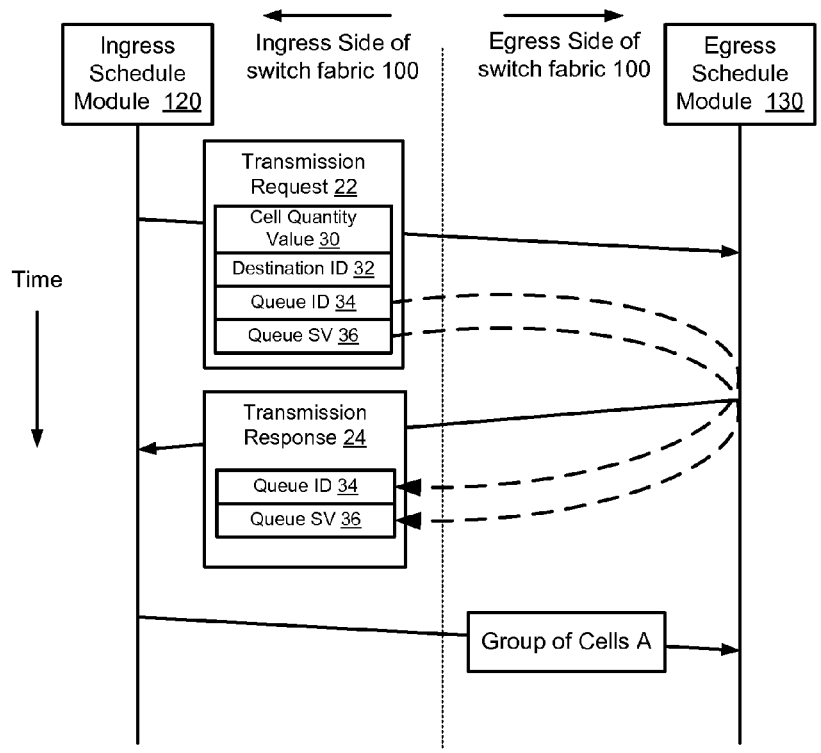
FIG. 1B is a signaling flow diagram that illustrates signaling related to transmission of a group of cells shown in FIG. 1A, according to an embodiment.

FIG. 1B is a signaling flow diagram that illustrates signaling related to the transmission of the group of cells A, according to an embodiment. As shown in FIG. 1B, time is increasing in a downward direction. After the group of cells A has been defined (as shown in FIG. 1A), the ingress schedule module 120 can be configured to send a request to schedule the group of cells A for transmission via the switch fabric 100; the request is shown as a transmission request 22. The transmission request 22 can be defined as a request to transmit the group of cells A to egress port $P_1$, which is the destination port of the group of cells A. In some embodiments, the destination port of the group of cells A can be referred to as a target of the transmission request 22 (also can be referred to as a target destination port). In some embodiments, the transmission request 22 can include a request to transmit the group of cells A via a particular transmission path (such as transmission path 12 shown in FIG. 1A) through the switch fabric 100, or at a particular time. The ingress schedule module 120 can be configured to send the transmission request 22 to the egress schedule module 130 after the transmission request 22 has been defined at the ingress schedule module 120.

In some embodiments, the transmission request 22 can be queued on an ingress side of the switch fabric 100 before being sent to the egress side of the switch fabric 100. In some embodiments, the transmission request 22 can be queued until the ingress schedule module 120 triggers sending of the transmission request 22 to the egress side of the switch fabric 100. In some embodiments, the ingress schedule module 120 can be configured to hold (or trigger holding of) the transmission request 22 in, for example, an ingress transmission request queue (not shown) because a volume of transmission requests for sending from the ingress side of the switch fabric 100 is higher than a threshold value. The threshold value can be defined based on latency of transmission via the switch fabric 100.

In some embodiments, the transmission request 22 can be queued at an egress queue (not shown) on an egress side of the switch fabric 100. In some embodiments, the egress queue can be included in a line card (not shown), can be disposed within or outside of the switch fabric 100, or can be disposed outside of the multi-stage switch 190. Although not shown, in some embodiments, the transmission request 22 can be queued in an egress queue or a portion of an egress queue associated with a specific ingress queue (e.g., ingress queue $Q_1$). In some embodiments, each of the egress ports 140 can be associated with egress queues that are associated with (e.g., correspond with) priority values of the ingress queues 110. For example, egress port $P_1$ can be associated with an egress queue (or portion of an egress queue) associated with ingress queue $Q_1$ (which can have a specified priority value) and an egress queue (or portion of an egress queue) associated with ingress queue $Q_K$ (which can have a specified priority value). Accordingly, a transmission request 22, which is queued at ingress queue $Q_1$, can be queued at the egress queue associated with ingress queue $Q_1$. In other words, the transmission request 22 can be queued in an egress queue (on an egress side of the switch fabric 100) associated with a priority value of at least one of the ingress queues 110. Similarly, the transmission request 22 can be queued in an ingress transmission request queue (not shown) or portion of an ingress transmission queue associated with a priority value of the at least one of the ingress queues 110.

If the egress schedule module 130 determines that the destination port of the group of cells A (i.e., egress port $P_1$ shown in FIG. 1A) is available to receive the group of cells A, the egress schedule module 130 can be configured to send a transmission response 24 to the ingress schedule module 120. The transmission response 24 can be, for example, an authorization for the group of cells A to be transmitted (e.g., transmitted from the ingress queue $Q_1$ shown in FIG. 1A) to the destination port of the group of cells A. An authorization to transmit the group of cells can be referred to as a transmission authorization. In some embodiments, the group of cells A and/or the ingress queue $Q_1$ can be referred to as a target of the transmission response 24.

In response to the transmission response 24, the ingress schedule module 120 can be configured to transmit the group of cells A from the ingress side of the switch fabric 100 to the egress side of the switch fabric 100 via the switch fabric 100. In some embodiments, the transmission response 24 can include an instruction to transmit the group of cells A via a particular transmission path (such as transmission path 12 shown in FIG. 1A) through the switch fabric 100, or at a particular time. In some embodiments, the instruction can be defined based on, for example, a routing policy.

As shown in FIG. 1B, the transmission request 22 includes a cell quantity value 30, a destination identifier (ID) 32, a queue identifier (ID) 34, and a queue sequence value (SV) 36 (which can collectively be referred to as a request tag). The cell quantity value 30 can represent a number of cells included in the group of cells A. For example, in this embodiment, the group of cells A includes seven (7) cells (shown in FIG. 1A). The destination identifier 32 can represent the destination port of the group of cells A so that the target of the transmission request 22 can be determined by the egress schedule module 130.

The cell quantity value 30 and the destination identifier 32 can be used by the egress schedule module 130 to schedule the group of cells A for transmission via the switch fabric 100 to egress port $P_1$ (shown in FIG. 1A). As shown in FIG. 1B, in this embodiment, the egress schedule module 130 is configured to define and send the transmission response 24 because the number of cells included in the group of cells A can be handled (e.g., can be received) at the destination port of the group of cells A (e.g., egress port $P_1$ shown in FIG. 1A).

In some embodiments, if the number of cells included in the group of cells A cannot be handled (e.g., cannot be received) at the destination port of the group of cells A (e.g., egress port $P_1$ shown in FIG. 1A) because the destination port of the group of cells A is unavailable (e.g., in an unavailable state, in a congested state), the egress schedule module 130 can be configured communicate the unavailability to the ingress schedule module 120. In some embodiments, for example, the egress schedule module 130 can be configured to deny the request (not shown) to transmit the group of cells A via the switch fabric 100 when the destination port of the group of cells A is unavailable. The denial of the transmission request 22 can be referred to as a transmission denial. In some embodiments, the transmission denial can include a response tag.

In some embodiments, the availability or unavailability of, for example, egress port $P_1$ (shown in FIG. 1A) can be determined by the egress schedule module 130 based on a condition being satisfied. For example, the condition can be related to a storage limit of a queue (not shown in FIG. 1A) associated with egress ports $P_1$ being exceeded, a flow rate of data via egress ports $P_1$, a number of cells already scheduled for transmission from the ingress queues 110 via the switch fabric 100 (shown in FIG. 1A), and so forth. In some embodiments, egress port $P_1$ can be unavailable to receive cells via the switch fabric 100 when egress port $P_1$ is disabled.

As shown in FIG. 1B, the queue identifier 34 and the queue sequence value 36 are transmitted to the egress schedule module 130 in the transmission request 22. The queue identifier 34 can represent and/or can be used to identify (e.g., uniquely identify) the ingress queue $Q_1$ (shown in FIG. 1A) where the group of cells A is being queued. The queue sequence value 36 can represent the location of the group of cells A with respect to other groups of cells within the ingress queue $Q_1$. For example, the group of cells A can be associated with a queue sequence value of X and the group of cells B (queued at ingress queue $Q_1$ shown in FIG. 1A) can be associated with a queue sequence value of Y. The queue sequence value of X can indicate that the group of cells A is to be transmitted from ingress queue $Q_1$ before the group of cells B, which is associated with a queue sequence value of Y.

In some embodiments, the queue sequence value 36 can be selected from a range of queue sequence values associated with ingress queue $Q_1$ (shown in FIG. 1A). The range of queue sequence values can be defined so that sequence values from the range of sequence values will not be repeated for a specified period of time for the ingress queue $Q_1$. For example, the range of queue sequence values can be defined so that queue sequence values from the range of queue sequence values may not be repeated during at least a period of time required to flush several cycles of cells (e.g., cells 10) queued at the ingress queue $Q_1$ through the multi-stage switch 190 (shown in FIG. 1A). In some embodiments, a queue sequence value can be incremented (within a range of queue sequence values) and associated with each group of cells that is defined by the ingress schedule module 120 based on cells 10 queued at ingress queue Q1.

In some embodiments, the range of queue sequence values associated with the ingress queue $Q_1$ can overlap with a range of queue sequence values associated with another of the ingress queues 110 (shown in FIG. 1A). Accordingly, the queue sequence value 36, even if from a non-unique range of queue sequence values, can be included with (e.g., included within) queue identifier 34 (which can be unique) to uniquely identify group of cells A (at least during a specified period of time). In some embodiments, the queue sequence value 36 can be unique within the switch fabric 100 or a globally unique value (GUID) (e.g., a universal unique identifier (UUID)).

In some embodiments, the ingress schedule module 120 can be configured to wait to define a transmission request (not shown) associated with group of cells B. For example, the ingress schedule module 120 can be configured to wait until transmission request 22 is sent or wait until a response (e.g., the transmission response 24, a transmission denial) is received in response to transmission request 22 before defining a transmission request associated with group of cells B.

As shown in FIG. 1B, the egress schedule module 130 can be configured to include the queue identifier 34 and the queue sequence value 36 (which can collectively be referred to as a response tag) in the transmission response 24. The queue identifier 34 and the queue sequence value 36 can be included in the transmission response 24 so that the transmission response 24 can be associated with the group of cells A at the ingress schedule module 120 when the transmission response 24 is received at the ingress schedule module 120. Specifically, the queue identifier 34 and the queue sequence value 36 can collectively be used to identify the group of cells A as being, for example, authorized for transmission via the switch fabric 100.

In some embodiments, the egress schedule module 130 can be configured to delay sending the transmission response 24 in response to the transmission request 22. In some embodiments, the egress schedule module 130 can be configured to delay responding if, for example, the destination port of the group of cells A (i.e., egress port $P_1$ shown in FIG. 1A) is unavailable (e.g., temporarily unavailable). In some embodiments, the egress schedule module 130 can be configured to send the transmission response 24 in response to egress port $P_1$ changing from an unavailable state to an available state.

In some embodiments, the egress schedule module 130 can be configured to delay sending the transmission response 24 because the destination port of the group of cells A (i.e., egress port $P_1$ shown in FIG. 1A) is receiving data from another of the ingress queues 110. For example, the egress port $P_1$ can be unavailable to receive data from ingress queue $Q_1$ because the egress port $P_1$ is receiving a different group of cells (not shown) from, for example, ingress queue $Q_K$ (shown in FIG. 1A). In some embodiments, groups of cells from ingress queue $Q_1$ can be associated with a higher priority value than groups of cells from ingress queue $Q_K$ based on priority values associated with ingress queue $Q_1$ and ingress queue $Q_K$. The egress schedule module 130 can be configured to delay sending of the transmission response 24 for a time period calculated based on, for example, a size of the different group of cells being received at egress port $P_1$. For example, the egress schedule module 130 can be configured to delay sending the transmission response 24 targeted to group of cells A for a projected time period required to complete processing of the different group of cells at egress port $P_1$. In other words, the egress schedule module 130 can be configured to delay sending the transmission response 24 targeted to group of cells A based on a projected time that the egress port $P_1$ will change from an unavailable state to an available state.

In some embodiments, the egress schedule module 130 can be configured to delay sending the transmission response 24 because at least a portion of a transmission path (such as transmission path 12 shown in FIG. 1A) through which the group of cells A is to be transmitted is unavailable (e.g., congested). The egress schedule module 130 can be configured to delay sending of the transmission response 24 until the portion of the transmission path is no longer congested, or based on a projected time that the portion of the transmission path will no longer be congested.

As shown in FIG. 1B, the group of cells A can be transmitted to the destination port of the group of cells A based on (e.g. in response to) the transmission response 24. In some embodiments, the group of cells A can be transmitted based on one or more instructions included in the transmission response 24. For example, in some embodiments, the group of cells A can be transmitted via the transmission path 12 (shown in FIG. 1A) based on an instruction included in the transmission response 24, or based on one or more rules for transmission of groups of cells via the switch fabric 100 (e.g., rules for transmission of groups of cells via a rearrangable switch fabric). Although not shown, in some embodiments, after the group of cells A has been received at egress port $P_1$ (shown in FIG. 1A), content (e.g., data packets) from the group of cells can be transmitted to one or more network entities (e.g., a personal computer, a server, a router, a PDA) via one or more networks (e.g., a LAN, a WAN, a virtual network) that can be wired and/or wireless.

Referring back to FIG. 1A, in some embodiments, the group of cells A can be transmitted via the transmission path 12 and received at an egress queue (not shown) that can be relatively small compared with, for example, the ingress queues 110. In some embodiments, the egress queue (or portion of the egress queue) can be associated with a priority value. The priority value can be associated with one or more of the ingress queues 110. The egress schedule module 130 can be configured to retrieve the group of cells A from the egress queue and can be configured to transmit the group of cells A to egress port $P_1$.

In some embodiments, the group of cells A can be retrieved and transmitted to egress port $P_1$ with a response identifier included with the group of cells A by the ingress schedule module 120 when the group of cells A is transmitted to the egress side of the switch fabric 100. The response identifier can be defined at the egress schedule module 130 and included in the transmission response 24. In some embodiments, if the group of cells A is queued at an egress queue (not shown) associated the destination port of the group of cells A, the response identifier can be used to retrieve the group of cells A from the destination port of the group of cells A so that the group of cells A can be transmitted from the switch fabric 100 via the destination port of the group of cells A. The response identifier can be associated with a location in the egress queue that has been reserved by the egress schedule module 130 for queuing of the group of cells A.

In some embodiments, a group of cells queued at the ingress queues 110 can be moved to the memory 122 when a transmission request (such as transmission request 22 shown in FIG. 1B) associated with the group of cells is defined. For example, a group of cells D queued at ingress queue $Q_K$ can be moved to the memory 122 in response to a transmission request associated with the group of cells D being defined. In some embodiments, the group of cells D can be moved to the memory 122 before the transmission request associated with the group of cells D is sent from the ingress schedule module 120 to the egress schedule module 130. The group of cells D can be stored in the memory 122 until the group of cells D is transmitted from the ingress side of the switch fabric 100 to the egress side of the switch fabric 100. In some embodiments, the group of cells can be moved to the memory 122 to reduce congestion (e.g., head-of-line (HOL) blocking) at the ingress queue $Q_K$.

In some embodiments, the ingress schedule module 120 can be configured to retrieve a group of cells stored in the memory 122 based on a queue identifier and/or a queue sequence value associated with the group of cells. In some embodiments, the location of the group of cells within the memory 122 can be determined based on a look-up table and/or an index value. The group of cells can be retrieved before the group of cells is transmitted from the ingress side of the switch fabric 100 to the egress side of the switch fabric 100. For example, the group of cells D can be associated with a queue identifier and/or a queue sequence value. A location within the memory 122 where the group of cells D is stored can be associated with the queue identifier and/or the queue sequence value. A transmission request defined by the ingress schedule module 120 and sent to the egress schedule module 130 can include the queue identifier and/or the queue sequence value. A transmission response received from the egress schedule module 130 can include the queue identifier and/or the queue sequence value. In response to the transmission response, the ingress schedule module 120 can be configured to retrieve the group of cells D from the memory 122 at the location based on the queue identifier and/or the queue sequence value, and the ingress schedule module 120 can trigger transmission of the group of cells D.

In some embodiments, a number of cells included in a group of cells can be defined based on an amount of space available in the memory 122. For example, the ingress schedule module 120 can be configured to define the number of cells included in the group of cells D based on an amount of available storage space included in the memory 122 at the time that the group of cells D is being defined. In some embodiments, the number of cells included in the group of cells D can be increased if the amount of available storage space included in the memory 122 increased. In some embodiments, the number of cells included in the group of cells D can be increased by the ingress schedule module 120 before and/or after the group of cells D is moved to the memory 122 for storage.

In some embodiments, a number of cells included in a group of cells can be defined based on a latency of transmission across, for example, the switch fabric 100. Specifically, the ingress schedule module 120 can be configured to define the size of a group of cells to facilitate flow across the switch fabric 100 in view of latencies associated with the switch fabric 100. For example, the ingress schedule module 120 can be configured to close a group of cells (e.g., define a size of the group of cells) because the group of cells has reached a threshold size defined based on the latency of the switch fabric 100. In some embodiments, the ingress schedule module 120 can be configured to immediately send a data packet in a group of cells, rather than wait for additional data packets to define a larger group of cells, because the latency across the switch fabric 100 is low.

In some embodiments, the ingress schedule module 120 can be configured to limit the number of transmission requests sent from the ingress side of the switch fabric 100 to the egress side of the switch fabric 100. In some embodiments, the limit can be defined based on a policy stored at the ingress schedule module 120. In some embodiments, a limit can be defined based on a priority value associated with one or more of the ingress queues 110. For example, ingress schedule module 120 can be configured to permit (based on a threshold limit) more transmission requests associated with ingress queue $Q_1$ than from ingress queue $Q_K$ because ingress queue $Q_1$ has a higher priority value than ingress queue $Q_K$.

In some embodiments, one or more portions of the ingress schedule module 120 and/or the egress schedule module 130 can be a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with the ingress schedule module 120 and/or the egress schedule module 130 can be included in different modules and/or combined into one or more modules. For example, the group of cells A can be defined by a first sub-module within the ingress schedule module 120 and the transmission request 22 (shown in FIG. 1B) can be defined by a second sub-module within the ingress schedule module 120.

In some embodiments, the switch fabric 100 can have more or less stages than are shown in FIG. 1A. In some embodiments, the switch fabric 100 can be a reconfigurable (e.g., a rearrangeable) switch fabric and/or a time-division multiplexed switch fabric. In some embodiments, switch fabric 100 can be defined based on a Clos network architecture (e.g., a strict sense non-blocking Clos network, a Benes network).

Figure 2:
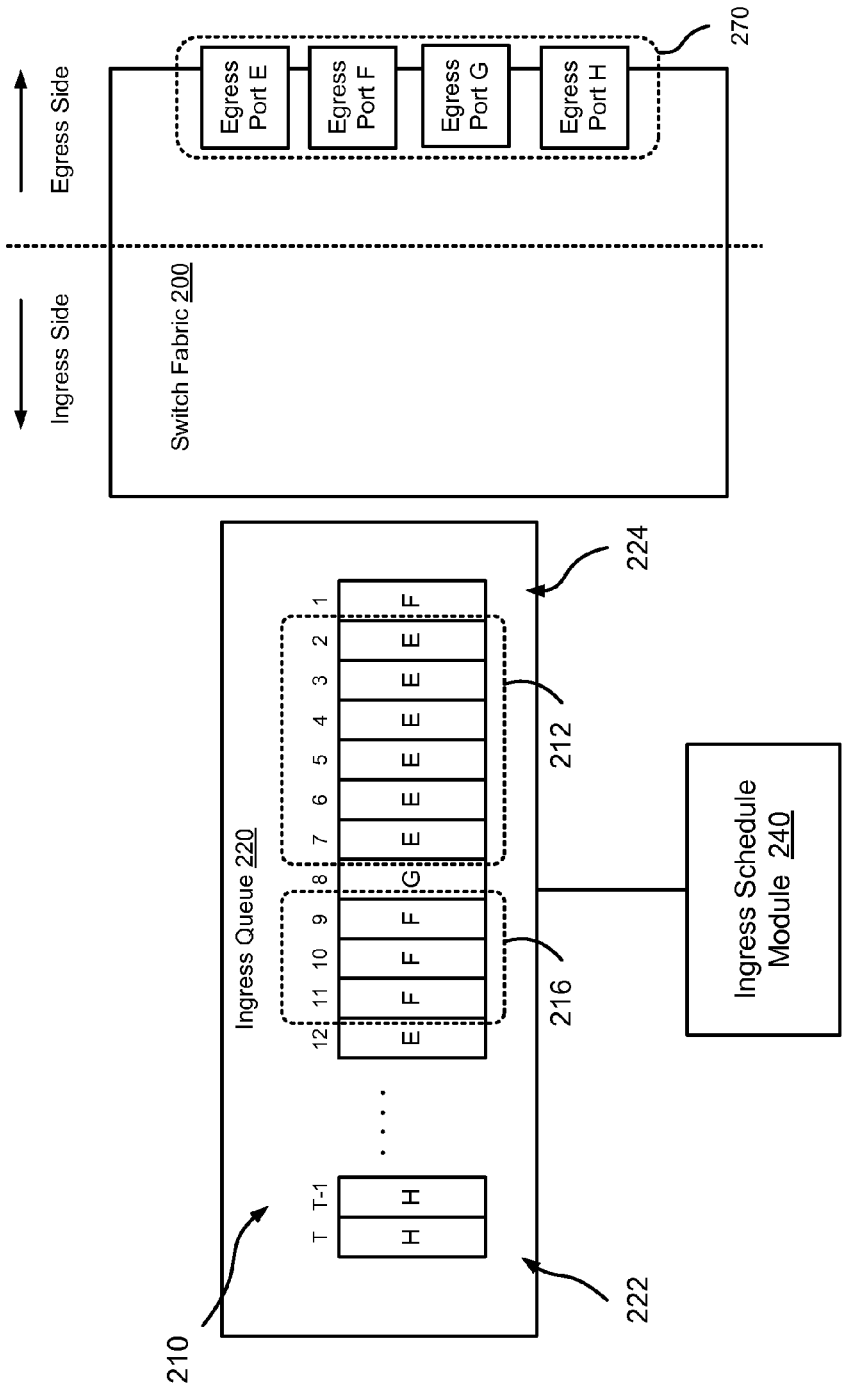
FIG. 2 is a schematic block diagram that illustrates two groups of cells queued at an ingress queue disposed on an ingress side of a switch fabric, according to an embodiment.

FIG. 2 is a schematic block diagram that illustrates two groups of cells queued at an ingress queue 220 disposed on an ingress side of a switch fabric 200, according to an embodiment. The groups of cells are defined by an ingress schedule module 240 on an ingress side of the switch fabric 200 that can be, for example, associated with a multi-stage switch and/or included in a multi-stage switch such as that shown in FIG. 1A. The ingress queue 220 is also on the ingress side of the switch fabric 200. In some embodiments, the ingress queue 220 can be included in an ingress line card (not shown) associated with the switch fabric 200. Although not shown, in some embodiments, one or more of the groups of cells can include many cells (e.g., 25 cells, 10 cells, 100 cells) or only one cell.

As shown in FIG. 2, the ingress queue 220 includes cells 1 through T (i.e., $cell_1$ through $cell_T$), which can collectively be referred to as queued cells 210. The ingress queue 220 is a FIFO type queue with $cell_1$ being at the front end 224 (or transmission end) of the queue and $cell_T$ being at the back end 222 (or entry end) of the queue. As shown in FIG. 2, queued cells 210 at the ingress queue 220 include a first group of cells 212 and a second group of cells 216. In some embodiments, each cell from the queued cells 210 can have an equal length (e.g., 32 byte length, 64 byte length). In some embodiments, two or more of the queued cells 210 can have different lengths.

Each cell from the queued cells 210 has content queued for transmission to one of four egress ports 270—egress port E, egress port F, egress port G, or egress port H—as indicated by the egress port label (e.g., letter "E", letter "F") on each cell from the queued cells 210. The egress port 270 to which a cell is to be transmitted can be referred to as a destination port. The queued cells 210 can each be transmitted to their respective destination port via the switch fabric 200. In some embodiments, the ingress schedule module 240 can be configured to determine the destination port for each cell from the queued cells 210 based on, for example, a look-up table (LUT) such as a routing table. In some embodiments, the destination port of each cell from the queued cells 210 can be determined based on a destination of content (e.g., data) included in the cell. In some embodiments, one or more of the egress ports 270 can be associated with an egress queue where cells can be queued until transmitted via the egress ports 270.

The first group of cells 212 and the second group of cells 216 can be defined by the ingress schedule module 240 based on the destination ports of the queued cells 210. As shown in FIG. 2, each cell included in the first group of cells 212 has the same destination port (i.e., egress port E) as indicated by the egress port labels "E." Similarly, each cell included in the second group of cells 216 has the same destination port (i.e., egress port F) as indicated by the egress port labels "F."

The groups of cells (e.g., the first group of cells 212) are defined based on destination port because the groups of cells are transmitted via the switch fabric 200 as a group. For example, if $cell_1$ were included in the first group of cells 212, the first group of cells 212 could not be delivered to a single destination port because $cell_1$ has a different destination port (egress port "F") than $cell_2$ through $cell_7$ (egress port "E"). Thus, the first group of cells 212 could not be delivered via the switch fabric 200 as a group.

The groups of cells are defined as continuous blocks of cells because the groups of cells are transmitted via the switch fabric 200 as a group and because the ingress queue 220 is a FIFO type queue. For example, $cell_{12}$, and $cell_2$ through $cell_7$ could not be defined as a group of cells because $cell_{12}$ cannot be transmitted with the block of cells $cell_2$ through $cell_7$. $Cell_8$ through $cell_{11}$ are intervening cells that must be transmitted from ingress queue 220 after $cell_2$ through $cell_7$ are transmitted from ingress queue 220, but before $cell_{12}$ is transmitted from ingress queue 220. In some embodiments, if the ingress queue 220 were not a FIFO type queue, one or more of the queued cells 210 could be transmitted out of order and groups could span intervening cells.

Although not shown, each cell from the queues cells 210 can have a sequence value that can be referred to as a cell sequence value. The cell sequence value can represent an order of, for example, $cell_2$ with respect to $cell_3$. The cell sequence value can be used to re-order the cells at, for example, one or more of the egress ports 270 before the content associated with the cells is transmitted from the egress ports 270. For example, in some embodiments, group of cells 212 can be received at an egress queue (not shown) associated with egress port E and re-ordered based on cell sequence values. In some embodiments, the egress queue can be relatively small (e.g., a shallow egress queue) compared with the ingress queue 220.

In addition, data (e.g., data packets) that is included within the cells can also have a sequence value that can be referred to as a data sequence value. For example, the data sequence value can represent a relative ordering of, for example, a first data packet with respect to a second data packet. The data sequence values can be used to re-order the data packets at, for example, one or more of the egress ports 270 before the data packets are transmitted from the egress ports 270.

Figure 3:
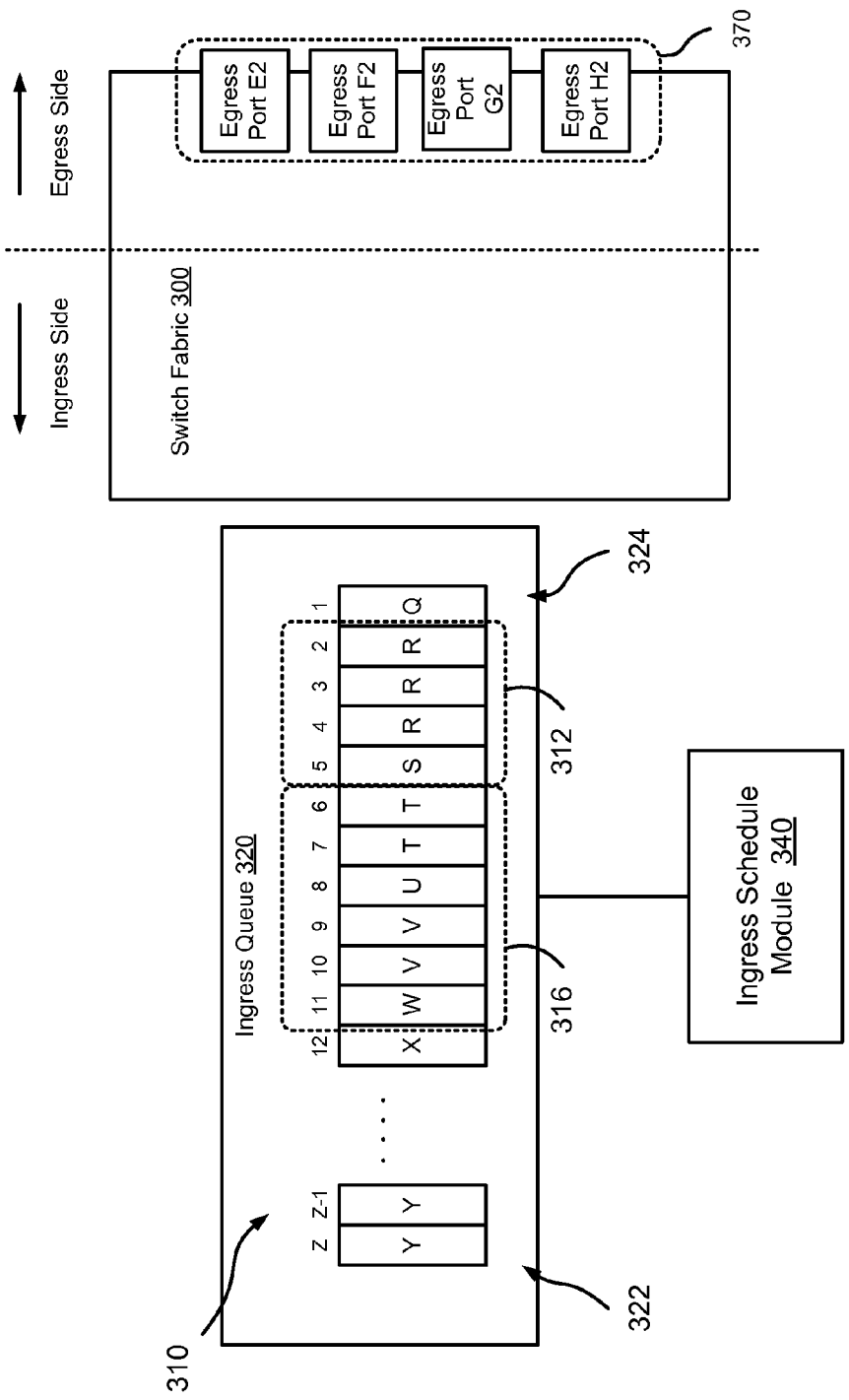
FIG. 3 is a schematic block diagram that illustrates two groups of cells queued at an ingress queue disposed on an ingress side of a switch fabric, according to another embodiment.

FIG. 3 is a schematic block diagram that illustrates two groups of cells queued at an ingress queue 320 disposed on an ingress side of a switch fabric 300, according to another embodiment. The groups of cells are defined by an ingress schedule module 340 on an ingress side of the switch fabric 300 that can be, for example, associated with a multi-stage switch and/or included in a multi-stage switch such as that shown in FIG. 1A. The ingress queue 320 is also on the ingress side of the switch fabric 300. In some embodiments, the ingress queue 320 can be included in an ingress line card (not shown) associated with the switch fabric 300. Although not shown, in some embodiments, one or more of the groups of cells can include only one cell.

As shown in FIG. 3, the ingress queue 320 includes cells 1 through Z (i.e., $cell_1$ through $cell_Z$), which can collectively be referred to as queued cells 310. The ingress queue 320 is a FIFO type queue with $cell_1$ being at the front end 324 (or transmission end) of the queue and $cell_Z$ being at the back end 322 (or entry end) of the queue. As shown in FIG. 3, queued cells 310 at the ingress queue 320 include a first group of cells 312 and a second group of cells 316. In some embodiments, each cell from the queued cells 310 can have an equal length (e.g., 32 byte length, 64 byte length). In some embodiments, two or more of the queued cells 310 can have different lengths. In this embodiment, ingress queue 320 is mapped to egress port F2 so that all of the cells 310 are scheduled by the ingress schedule module 340 for transmission via the switch fabric 300 to egress port F2.

Each cell from the queued cells 310 has content associated with one or more data packets (e.g., Ethernet data packets). The data packets are represented by the letters "Q" through "Y." For example, as shown in FIG. 3, data packet R is divided into three different cells, $cell_2$, $cell_3$, and $cell_4$.

The groups of cells (e.g., the first group of cells 312) are defined so that portions of data packets are not associated with different groups of cells. Said differently, the groups of cells are defined so that entire data packets are associated with a single group of cells. The boundaries of the groups of cells are defined based on boundaries of the data packets queued at ingress queue 320 so that the data packets are not included in different groups of cells. Dividing data packets into different groups of cells could result in undesirable consequences such as buffering at the egress side of the switch fabric 300. For example, if a first portion of data packet T (e.g., $cell_6$) was included in the first group of cells 312 and second portion of data packet T (e.g., $cell_7$) was included in the second group of cells 316, the first portion of data packet T would have to be buffered in at least a portion of one or more egress queues (not shown) at the egress side of the switch fabric 300 until the second portion of the data packet T were transmitted to the egress side of the switch fabric 300 so that the entire data packet T could be transmitted from the switch fabric 300 via egress port E2.

In some embodiments, the data packets that are included within the queued cells 310 can also have a sequence value that can be referred to as a data sequence value. The data sequence value can represent a relative ordering of, for example, data packet R with respect to a data packet S. The data sequence values can be used to re-order the data packets at, for example, one or more of the egress ports 370 before the data packets are transmitted from the egress ports 370.

Figure 4:
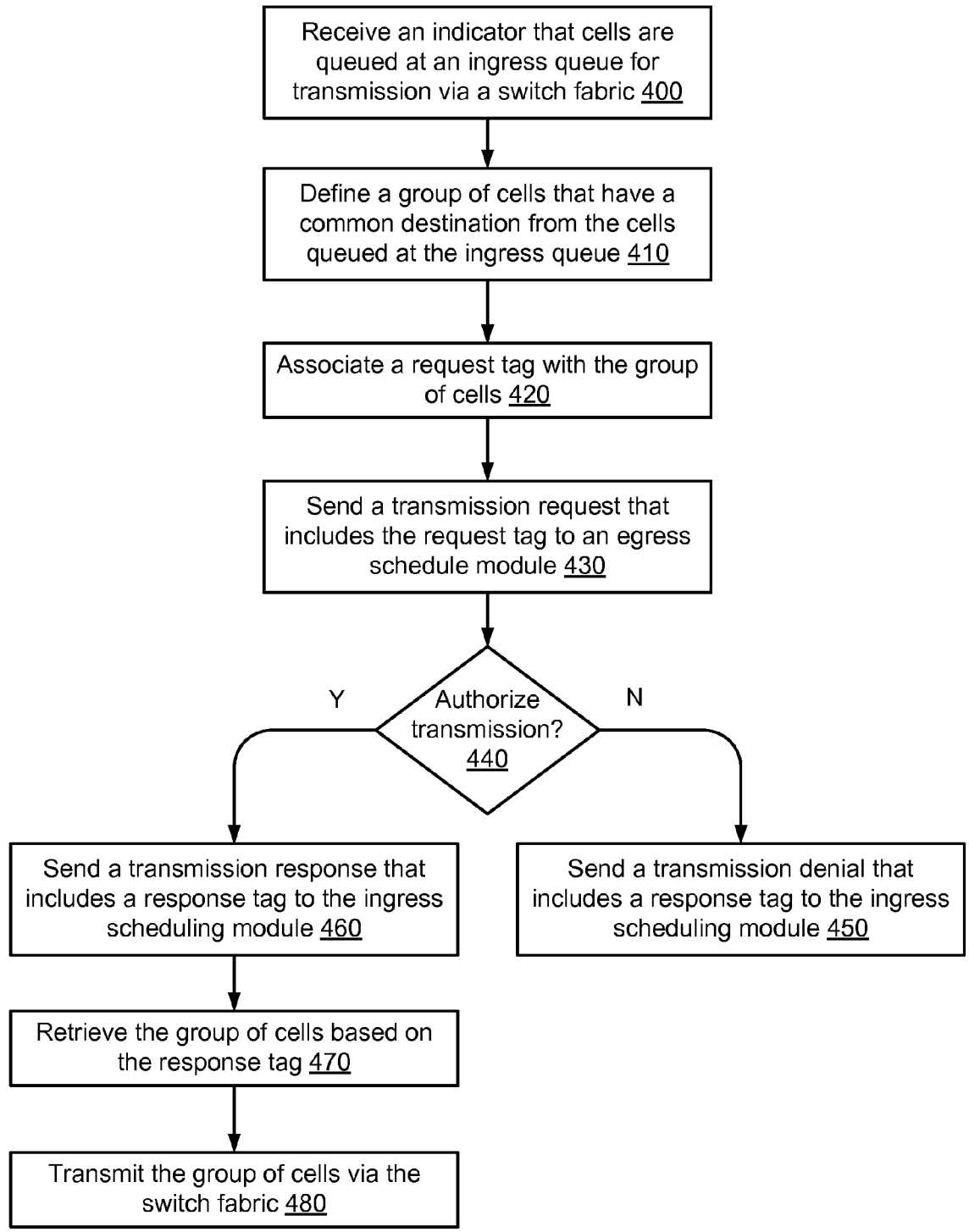
FIG. 4 is a flowchart that illustrates a method for scheduling transmission of a group of cells via a switch fabric, according to an embodiment.

FIG. 4 is a flowchart that illustrates a method for scheduling transmission of a group of cells via a switch fabric, according to an embodiment. As shown in FIG. 4, an indicator that cells are queued at an ingress queue for transmission via a switch fabric is received, at 400. In some embodiments, the switch fabric can be based on a Clos architecture and can have multiple stages. In some embodiments, the switch fabric can be associated with (e.g., can be within) a multi-stage switch. In some embodiments, the indicator can be received when new cells are received at the ingress queue, or when the cells are ready (or nearly ready) to be transmitted via the switch fabric.

A group of cells that have a common destination are defined from the cells queued at the ingress queue, at 410. The destination of each cell from the group of cells can be determined based on a look-up table. In some embodiments, the destination can be determined based on a policy and/or based on a packet classification algorithm. In some embodiments, the common destination can be a common destination port associated with an ingress portion of the switch fabric.

A request tag is associated with the group of cells, at 420. The request tag can include, for example, one or more of a cell quantity value, a destination identifier, a queue identifier, a queue sequence value, and so forth. The request tag can be associated with the group of cells before the group of cells is transmitted to an ingress side of the switch fabric.

A transmission request that includes the request tag is sent to an egress schedule module, at 430. In some embodiments, the transmission request can include a request to be transmitted at a particular time or via a particular transmission path. In some embodiments, the transmission request can be sent after the group of cells has been stored in a memory associated with an ingress stage of the switch fabric. In some embodiments, the group of cells can be moved to the memory to reduce the probability of congestion at the ingress queue. In other words, the group of cells can be moved to the memory so that other cells queued behind the group of cells can be prepared for transmission (or transmitted) from the ingress queue without waiting for the group of cells to be transmitted from the ingress queue. In some embodiments, the transmission request can be a request to transmit to a specified egress port (e.g., a specified destination port).

A transmission denial that includes a response tag is sent to the ingress scheduling module, at 450 when, in response to the transmission request, transmission via the switch fabric is not authorized at 440. In some embodiments, the transmission request can be denied because the switch fabric is congested, a destination port is unavailable, and so forth. In some embodiments, the transmission request can be denied for a specified period of time. In some embodiments, the response tag can include one or more identifiers that can be used to associate the transmission denial with the group of cells.

If the transmission via the switch fabric is authorized at 440, a transmission response that includes a response tag to the ingress scheduling module is sent, at 460. In some embodiments, the transmission response can be a transmission authorization. In some embodiments, the transmission response can be sent after a destination of the group of cells is ready (or nearly ready) to receive the group of cells.

The group of cells is retrieved based on the response tag, at 470. If the group of cells has been moved to a memory, the group of cells can be retrieved from the memory. If the group of cells is queued at the ingress queue, the group of cells can be retrieved from the ingress queue. The group of cells can be retrieved based on a queue identifier and/or a queue sequence value included in the response tag. The queue identifier and/or the queue sequence value can be from the queue tag.

The group of cells can be transmitted via the switch fabric, at 480. The group of cells can be transmitted via the switch fabric according to an instruction included in the transmission response. In some embodiments, the group of cells can be transmitted at a specified time and/or via a specified transmission path. In some embodiments, the group of cells can be transmitted via the switch fabric to a destination such as an egress port. In some embodiments, after being transmitted via the switch fabric, the group of cells can be queued at an egress queue associated with a destination (e.g., destination port) of the group of cells.

Figure 5:
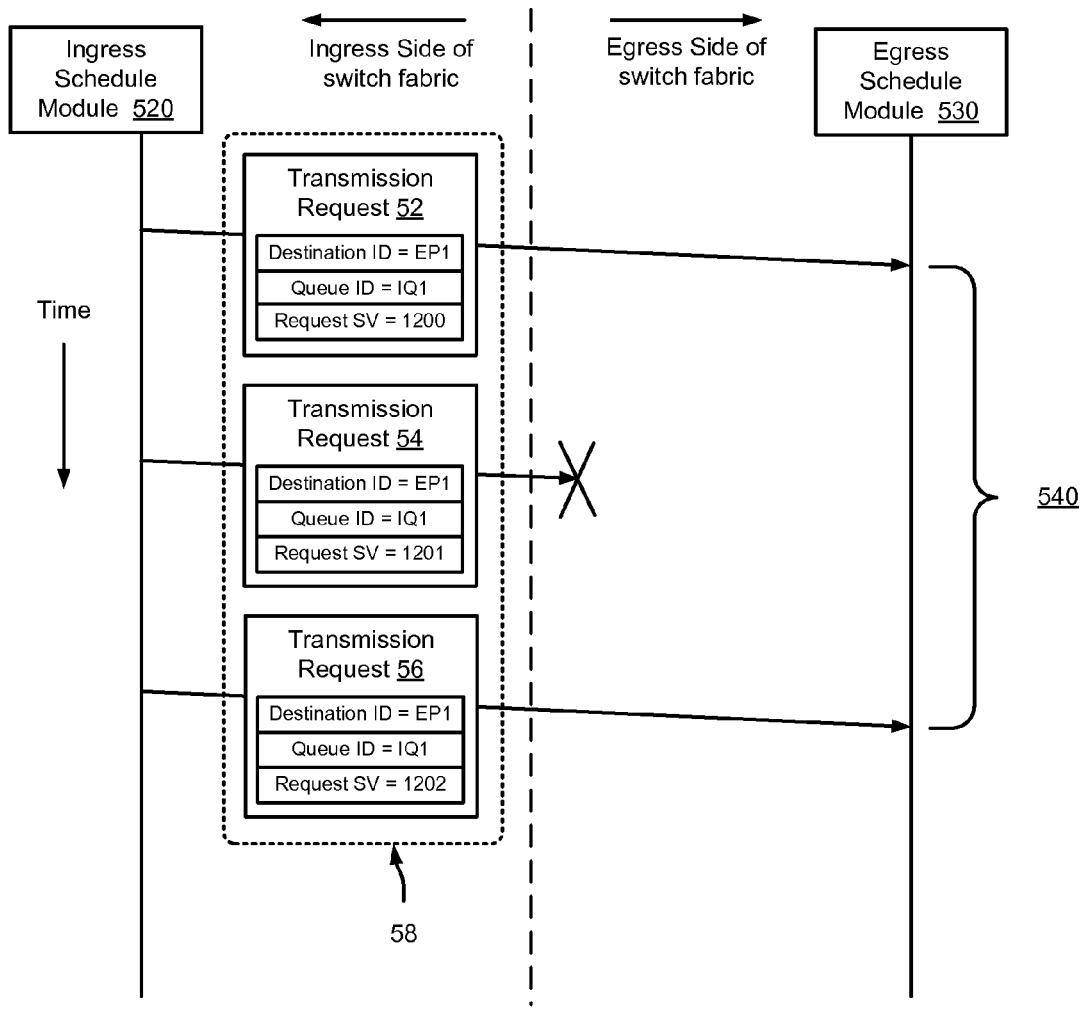
FIG. 5 is a signaling flow diagram that illustrates request sequence values associated with transmission requests, according to an embodiment.

FIG. 5 is a signaling flow diagram that illustrates processing of request sequence values associated with transmission requests, according to an embodiment. As shown in FIG. 5, a transmission request 52 is transmitted from an ingress schedule module 520 on an ingress side of a switch fabric to an egress schedule module 530 on an egress side of a switch fabric. A transmission request 56 is transmitted from the ingress schedule module 520 to the egress schedule module 530 after the transmission request 52 is transmitted. As shown in FIG. 5, transmission request 54 is transmitted from ingress schedule module 530, but is not received by egress schedule module 530. Transmission request 52, transmission request 54, and transmission request 56 are each associated with the same ingress queue IQ1 as indicated by their respective queue identifiers, and are associated with the same destination port EP1 as indicated by their respective destination identifiers. Transmission request 52, transmission request 54 and transmission request 56 can collectively be referred to as transmission requests 58. As shown in FIG. 5, time is increasing in a downward direction.

As shown in FIG. 5, each of the transmission requests 58 can include a request sequence value (SV). The request sequence values can represent a sequence of a transmission request with respect to other transmission requests. In this embodiment, the request sequence values can be from a range of request sequence values that are associated with the destination port EP1, and are incremented in whole integers in numerical order. In some embodiments, the request sequence values can be, for example, strings and can be incremented in a different order (e.g., reverse numerical order). Transmission request 52 includes a request sequence value of 1200, transmission request 54 includes a request sequence value of 1201, and transmission request 56 includes a request sequence value of 1202. In this embodiment, the request sequence value of 1200 indicates that transmission request 52 was defined and sent before transmission request 54, which has a request sequence value of 1201.

The egress schedule module 530 can determine that transmission of a transmission request from ingress schedule module 520 may have failed based on the request sequence values. Specifically, the egress schedule module 530 can determine that a transmission request associated with the request sequence value of 1201 was not received before transmission request 56, which is associated with request sequence value 1202, was received. In some embodiments, the egress schedule module 530 can execute an action with respect to the missing transmission request 54 when a time period between receipt of transmission request 52 and transmission request 56 (shown as time period 540) exceeds a threshold time period. In some embodiments, egress schedule module 530 can request that ingress schedule module 520 retransmit transmission request 54. The egress schedule module 530 can include the missing request sequence value so that the ingress schedule module 520 can identify the transmission request 54 that was not received. In some embodiments, egress schedule module 530 can deny a request for transmission of a group of cells included in transmission request 56. In some embodiments, the egress schedule module 530 can be configured to process and/or respond to transmission requests (such as transmission requests 58) based on queue sequence values in a substantially similar fashion to the methods described in connection with request sequence values.

Figure 6:
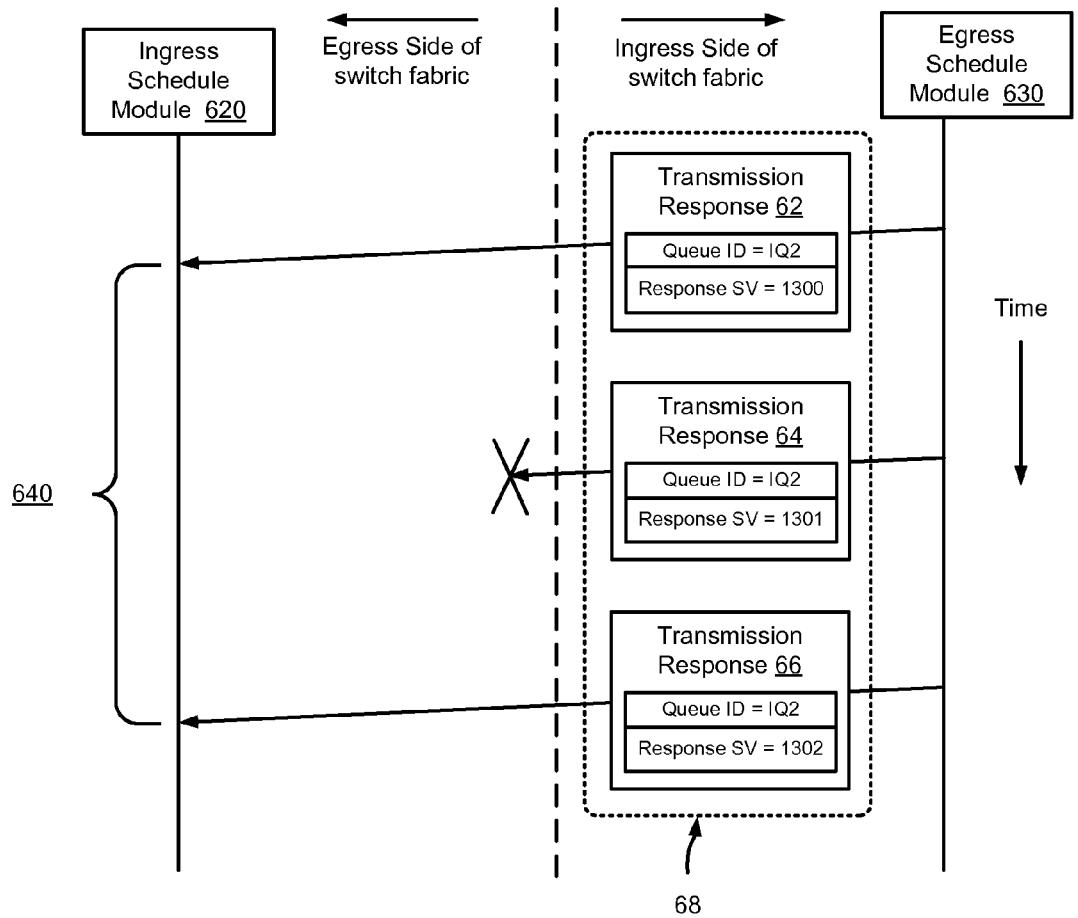
FIG. 6 is a signaling flow diagram that illustrates response sequence values associated with transmission responses, according to an embodiment.

FIG. 6 is a signaling flow diagram that illustrates response sequence values associated with transmission responses, according to an embodiment. As shown in FIG. 6, a transmission response 62 is transmitted from an egress schedule module 630 on an egress side of a switch fabric to an ingress schedule module 620 on an ingress side of a switch fabric. A transmission response 66 is transmitted from the egress schedule module 630 to the ingress schedule module 620 after the transmission response 62 is transmitted. As shown in FIG. 6, transmission response 64 is transmitted from egress schedule module 630, but is not received by ingress schedule module 620. Transmission response 62, transmission response 64, and transmission response 66 are associated with the same ingress queue IQ2 as indicated by their respective queue identifiers. Transmission response 62, transmission response 64 and transmission response 66 can collectively be referred to as transmission responses 68. As shown in FIG. 1B, time is increasing in a downward direction.

As shown in FIG. 6, each of the transmission responses 68 can include an response sequence value (SV). The response sequence values can represent a sequence of a transmission response with respect to other transmission responses. In this embodiment, the response sequence values can be from a range of response sequence values that are associated with the ingress queue IQ2, and are incremented in whole integers in numerical order. In some embodiments, the response sequence values can be, for example, strings and can be incremented in a different order (e.g., reverse numerical order). Transmission response 62 includes an response sequence value of 1300, transmission response 64 includes an response sequence value of 1301, and transmission response 66 includes an response sequence value of 1302. In this embodiment, the response sequence value of 1300 indicates that transmission response 62 was defined and sent before transmission response 64, which has an response sequence value of 1301.

The ingress schedule module 620 can determine that transmission of a transmission response from egress schedule module 630 may have failed based on the response sequence values. Specifically, the ingress schedule module 620 can determine that a transmission response associated with the response sequence value of 1301 was not received before transmission response 66, which is associated with the response sequence value of 1302, was received. In some embodiments, the ingress schedule module 620 can execute an action with respect to the missing transmission response 64 when a time period between receipt of transmission response 62 and transmission response 66 (shown as time period 640) exceeds a threshold time period. In some embodiments, ingress schedule module 620 can request that egress schedule module 630 retransmit transmission response 64. The ingress schedule module 620 can include the missing response sequence value so that the egress schedule module 630 can identify the transmission response 64 that was not received. In some embodiments, ingress schedule module 620 can drop a group of cells when a transmission response associated with a transmission request is not received within a specified period of time.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, the embodiments described herein can be applied in a multi-stage queuing system.

What is claimed is:

1. An apparatus, comprising:
   an egress schedule module implemented in at least one of a memory or a processing device, the egress schedule module configured to receive, from an ingress schedule module associated with an ingress stage of a multi-stage switch fabric, a request to schedule transmission of a group of cells from an ingress queue, the group of cells including at least two cells, the request including a sequence value representing an order of the group of cells within a plurality of cells in the ingress queue, the egress schedule module being associated with an egress stage of the multi-stage switch fabric, the egress schedule module configured to define, in response to the request, a response including the sequence value when an egress port associated with the egress stage of the multi-stage switch fabric is available to transmit the group of cells, the egress schedule module configured to send the response to the ingress schedule module.

2. The apparatus of claim 1, wherein the multi-stage switch fabric has a Clos network architecture.

3. The apparatus of claim 1, wherein each cell from the group of cells is associated with a common destination address.

4. The apparatus of claim 1, wherein the request includes a quantity value corresponding to a number of cells included in the group of cells, the egress schedule module configured to define the response based on the quantity value included in the request.

5. The apparatus of claim 1, wherein:

the group of cells is a first group of cells, the request includes a quantity value corresponding to a number of cells included in the first group of cells, the egress schedule module configured to receive a request to schedule transmission of a second group of cells, the egress schedule module configured to send, after a waiting time period defined based on the quantity value associated with the first group of cells, a response associated with the request to schedule transmission of the second group of cells.

6. An apparatus, comprising:

an ingress schedule module implemented in at least one of a memory or a processing device, the ingress schedule module configured to define a transmission request having a sequence value associated with a group of cells queued at an ingress queue associated with an ingress stage of a multi-stage switch fabric, the group of cells including at least two cells, the sequence value representing an order of the group of cells within a plurality of cells queued at the ingress queue, the ingress schedule module being associated with the ingress stage of the multi-stage switch fabric, the ingress schedule module configured to send the transmission request to an egress schedule module associated with an egress stage of the multi-stage switch fabric, the ingress schedule module configured to receive from the egress schedule module a response having the sequence value and in response to the group of cells being scheduled for transmission through a middle stage of the multi-stage switch fabric.

7. The apparatus of claim 6, wherein the group of cells is a first group of cells, the ingress schedule module configured to define a transmission request for a second group of cells queued at the ingress queue, the ingress schedule module configured to send the transmission request for the second group of cells to the egress schedule module, the ingress schedule module configured to drop the second group of cells from the ingress queue when a response associated with the second group of cells is not received at the ingress schedule module within a threshold period of time after sending of the transmission request for the second group of cells from the ingress schedule module.

8. The apparatus of claim 6, wherein the group of cells is a first group of cells, the ingress schedule module configured to define a transmission request for a second group of cells queued at the ingress queue, the ingress schedule module configured to send the transmission request for the second group of cells to the egress schedule module, the ingress schedule module configured to resend the transmission request for the second group of cells when a response associated with the second group of cells is not received at the ingress schedule module within a threshold period of time after sending of the transmission request for the second group of cells from the ingress schedule module.

9. The apparatus of claim 6, wherein the ingress schedule module is configured to store, after defining the transmission request, the group of cells in a memory location different from the ingress queue.

10. The apparatus of claim 6, wherein the ingress queue implemented at a line card associated with the ingress stage.

11. The apparatus of claim 6, wherein the ingress queue is associated with a priority value, the ingress schedule module configured to define the transmission request based on the priority value.

12. A method, comprising:

defining a group of cells from a plurality of cells based on a position of the group of cells in the plurality of cells and a common destination address associated with each cell from the group of cells, the group of cells being mutually exclusive from the remaining cells from the plurality of cells, the common destination address associated with the group of cells being different from a destination address associated with at least one cell from the remaining cells, the plurality of cells being queued at an ingress queue associated with an ingress side of a multi-stage switch fabric;

defining a request to transmit the group of cells from the ingress side of the multi-stage switch fabric to an egress side of the multi-stage switch fabric, the request including a sequence value associated with the group of cells, the sequence value being a queue sequence value representing an order of the group of cells within the plurality of cells;

sending the request to the egress side of the multi-stage switch fabric; and receiving a response in response to the group of cells being scheduled for transmission from the ingress side of the multi-stage switch fabric to the egress side of the multi-stage switch fabric, the response being a delayed response if destination port availability criteria are not met.

13. The method of claim 12, wherein each cell from the group of cells has content associated with at least one data packet.

14. The method of claim 12, wherein a cell from the group of cells has content associated with multiple data packets.

15. The method of claim 12, wherein each cell from the group of cells has an equal cell size.

16. The method of claim 12, wherein each cell from the group of cells includes a data sequence value representing an order of content encoded within the group of cells.

17. The method of claim 12, further comprising:

retrieving at least a portion of the group of cells from a memory such that the portion of the group of cells can be transmitted from the ingress side of the multi-stage switch fabric to the egress side of the multi-stage switch fabric.

18. The method of claim 12, wherein a boundary of the group of cells is defined based on a boundary associated with a data packet included in the group of cells.

19. A method, comprising:
- defining a group of cells from a plurality of cells based on a position of the group of cells in the plurality of cells and a common destination address associated with each cell from the group of cells, the group of cells being mutually exclusive from the remaining cells from the plurality of cells, the common destination address associated with the group of cells being different from a destination address associated with at least one cell from the remaining cells, the plurality of cells being queued at an ingress queue associated with an ingress side of a multi-stage switch fabric;
- defining a request to transmit the group of cells from the ingress side of the multi-stage switch fabric to an egress side of the multi-stage switch fabric the request includes a sequence value associated with the group of cells, the sequence value being a request sequence value indicating an order of the request with respect to a plurality of requests defined at the ingress side of the multi-stage switch fabric;
- sending the request to the egress side of the multi-stage switch fabric; and
- receiving a response in response to the group of cells being scheduled for transmission from the ingress side of the multi-stage switch fabric to the egress side of the multi stage switch fabric, the response being a delayed response if destination port availability criteria are not met.

* * * * *